(12) United States Patent
Sun et al.

(10) Patent No.: US 11,300,161 B2
(45) Date of Patent: Apr. 12, 2022

(54) METHOD FOR CONSTRUCTING ACTIVE MAGNETIC BEARING CONTROLLER BASED ON LOOK-UP TABLE METHOD

(71) Applicant: JIANGSU UNIVERSITY, Zhenjiang (CN)

(72) Inventors: Xiaodong Sun, Zhenjiang (CN); Zhijia Jin, Zhenjiang (CN); Long Chen, Zhenjiang (CN); Zebin Yang, Zhenjiang (CN); Weiqi Zhou, Zhenjiang (CN); Ke Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/294,433

(22) PCT Filed: Jul. 24, 2020

(86) PCT No.: PCT/CN2020/103958
§ 371 (c)(1),
(2) Date: May 17, 2021

(87) PCT Pub. No.: WO2021/237910
PCT Pub. Date: Dec. 2, 2021

(65) Prior Publication Data
US 2021/0372480 A1    Dec. 2, 2021

(30) Foreign Application Priority Data

May 29, 2020   (CN) .......................... 202010473087.X

(51) Int. Cl.
*H01F 7/06*      (2006.01)
*F16C 43/00*     (2006.01)
(Continued)

(52) U.S. Cl.
CPC ............ *F16C 43/00* (2013.01); *F16C 32/044* (2013.01); *H01F 7/06* (2013.01); *H01F 7/08* (2013.01);
(Continued)

(58) Field of Classification Search
CPC .......... F16C 43/00; F16C 32/044; H01F 7/06; H01F 7/08; H01F 27/24; H01F 27/28
See application file for complete search history.

(56) References Cited

U.S. PATENT DOCUMENTS 5,347,190 A * 9/1994 Lewis ................. F16C 32/0455
                                                    310/90.5
6,590,366 B1 * 7/2003 Browning ........... F16C 32/0451
                                                    310/90.5
(Continued)

FOREIGN PATENT DOCUMENTS

CN         103034127 A      4/2013
CN         103645637 A      3/2014
(Continued)

*Primary Examiner* — Paul D Kim
(74) *Attorney, Agent, or Firm* — Bayramoglu Law Offices LLC

(57) ABSTRACT

A method for constructing an active magnetic bearing controller based on a look-up table method includes: building finite element models of an active magnetic bearing to obtain two universal Kriging prediction models in X-axis and Y-axis directions about actual suspension forces being in association with actual displacement eccentricities and actual control currents in the X-axis and Y-axis directions of the active magnetic bearing based on a universal Kriging model; creating two model state tables in the X-axis and Y-axis directions about the actual suspension forces being in association with the actual displacement eccentricities and the actual control currents to construct two look-up table modules with the two built-in model state tables, respectively; and constructing an active magnetic bearing control- (Continued)

ler by using two fuzzy adaptive PID controllers, two amplifier modules in the X-axis and Y-axis directions, the two look-up table modules, and two measurement modules in the X-axis and Y-axis directions.

6 Claims, 2 Drawing Sheets

(51) Int. Cl.
*F16C 32/04* (2006.01)
*H01F 7/08* (2006.01)
*H01F 27/24* (2006.01)
*H01F 27/28* (2006.01)
*H01F 5/00* (2006.01)
*H02K 15/04* (2006.01)

(52) U.S. Cl.
CPC ............ *H01F 27/24* (2013.01); *H01F 27/28* (2013.01); *H01F 5/00* (2013.01); *H02K 15/04* (2013.01)

(56) References Cited

U.S. PATENT DOCUMENTS 9,293,971 B2 *  3/2016  Benbouzid .......... F16C 32/0451
10,833,557 B2 *  11/2020  Severson ................ H02P 25/22

FOREIGN PATENT DOCUMENTS

CN         110552961 A      12/2019
WO           9940334 A1      8/1999

* cited by examiner

METHOD FOR CONSTRUCTING ACTIVE MAGNETIC BEARING CONTROLLER BASED ON LOOK-UP TABLE METHOD

CROSS REFERENCE TO THE RELATED APPLICATIONS

This application is the national phase entry of International Application No. PCT/CN2020/103958, filed on Jul. 24, 2020, which is based upon and claims priority to Chinese Patent Application No. 202010473087.X, filed on May 29, 2020, the entire contents of inch are incorporated herein by reference.

TECHNICAL HELD

The present invention relates to a technology of controlling active magnetic bearings, which is applicable to control of active magnetic bearings in high-speed operating devices such as high-speed compressors, wind power generators, and molecular pumps and belongs to the technical field of magnetic suspension, and in particular, to a method for constructing an active magnetic bearing controller.

BACKGROUND

A magnetic bearing is a rotor support system that uses the electromagnetic force to overcome the gravity and the interference force of a rotor and realizes suspension of the rotor without mechanical contact. It has the characteristics of no mechanical contact, long service life, and easy maintenance. Besides, its stiffness and damping are adjustable, and the output of the electromagnetic force can be flexibly adjusted by controlling the current in the windings to realize dynamic adjustment of the stiffness and damping of the magnetic bearing. At present, applications of molecular pumps, wind power generation, flywheel energy storage, and the like that use high-speed rotating shafts are increasing. Conventional mechanical bearings will greatly reduce the service life of the devices due to friction loss. Therefore, the applications of magnetic bearings have been continuously promoted.

Magnetic bearings can be divided into three types: active, passive, and hybrid magnetic bearings. The active magnetic bearings are widely used due to advantages such as simple structures and adjustable suspension forces. However, at present, the stability control of the active magnetic bearings has defects, and the biggest problem lies in the inability to obtain accurate control models, that is, current stiffness and displacement stiffness. The existing control methods generally use fixed current stiffness coefficients and displacement stiffness coefficients. However, the displacements, currents, and suspension forces of the active magnetic bearings are in approximately linear relationships only when the active magnetic bearings are at working points. When the displacements and the currents change greatly, the models will no longer be accurate. Fuzzy logic control, neural network control, parameter adjustment control based on advanced algorithms, and the like are generally used in the prior art. They make very limited adjustments to the models, or their adjustment of control only lies in the adjustment of controller parameters. Thus, there is an urgent need for a reasonable method that can change model parameters with the displacement change of the rotor of the active magnetic bearing to achieve more accurate control.

At present, the look-up table method has been used to a certain extent in the control methods of various fields. The look-up table method is a control method which obtains corresponding results through data in a table or through interpolation calculation by using known test or simulation data in the control. It is also widely used in the electrical field. For example, in the control of a switched reluctance motor, flux linkage information is obtained through look-up table by using position information from a sensor and the magnitude of a control current. Therefore, with reference to the existing look-up table method, it is a feasible solution to obtain accurate model parameters by using the look-up table method in the control of the active magnetic bearings. However, the existing look-up table method has some problems. The major problem is that the creation of a usable parameter table requires plenty of experiments or simulations and repeated verifications, so that the experimental costs and time costs are high, Therefore, how to quickly create a parameter table with high accuracy is a problem worth studying.

The Kriging model is a regression algorithm for spatial modeling and prediction of a random process or random field based on a covariance function. In a specific random process, for example, an intrinsically stationary process, the Kriging model can provide the best linear unbiased estimation (BLUE), which is also called spatial BLUE in statistics. Therefore, the Kriging model is applied in many fields such as geographical science, environmental science, and atmospheric science. In many cases, non-stationary regionalized variables occur, and a universal Kriging model is required for processing. Through the universal Kriging model, a parameter table of an active magnetic bearing can be obtained by using only a small amount of data.

SUMMARY

The objective of the present invention is to provide a method for constructing an active magnetic bearing controller based on a look-up table method, to solve the problem of inaccurate models in the control of active magnetic bearings in the prior art. In the method, universal Kriging models are used to create model state tables, the control of an active magnetic bearing is implemented through the look-up table method, and current stiffness coefficients and displacement stiffness coefficients can be adjusted in real time according to displacement and current changes of the active magnetic bearing during operation.

The method for constructing an active magnetic bearing controller based on a look-up table method according to the present invention adopts a technical solution with the following steps:

Step (1): building finite element models of an active magnetic bearing, and obtaining, by using the finite element models and based on a general universal Kriging model, two universal Kriging prediction models about actual suspension forces $\hat{F}_x$, $\hat{F}_y$ being in association with actual displacement eccentricities $\hat{x}_0$, $\hat{y}_0$ and actual control currents $\hat{i}_x$, $\hat{i}_y$ in X-axis and Y-axis directions;

Step (2): creating, based on the two universal Kriging prediction models, two model state tables about the actual suspension forces $\hat{F}_x$, $\hat{F}_y$ being in association with the actual displacement eccentricities $\hat{x}_0$, $\hat{y}_0$ and the actual control currents $\hat{i}_x$, $\hat{i}_y$ to construct two corresponding look-up table modules with the two model state tables being built in, respectively; and Step (3): constructing an active magnetic bearing controller by using two fuzzy adaptive proportional-integral-derivative (PID) controllers, two amplifier modules, two look-up table modules, and two measurement modules in the X-axis and Y-axis directions, wherein the fuzzy adaptive PID controller, the amplifier module, and the look-up table module in the X-axis direction are connected in series and then connected to an input end of the active magnetic bearing; the fuzzy adaptive PID controller, the amplifier module, and the look-up table module in the Y-axis direction are connected in series and then connected to the input end of the active magnetic bearing; the two measurement modules in the X-axis and Y-axis directions measure the actual displacement eccentricities $\hat{x}_0$, $\hat{y}_0$ of the active magnetic bearing in the X-axis and Y-axis directions, respectively; the actual displacement eccentricities $\hat{x}_0$, $\hat{y}_0$ are input into the two corresponding look-up table modules, respectively; reference displacements x*, y* in the X-axis and Y-axis directions are subtracted from the corresponding actual displacement eccentricities $\hat{x}_0$, $\hat{y}_0$ to obtain displacement errors $e_x$, $e_y$, respectively; initial control currents $I_{x0}$, $I_{y0}$ are obtained through the corresponding fuzzy adaptive PID controllers by using the displacement errors $e_x$, $e_y$, and actual control currents $\hat{i}_x$, $\hat{i}_y$ are obtained through the corresponding amplifier modules by using the initial control currents $I_{x0}$, $I_{y0}$, respectively; the actual control currents $\hat{i}_x$, $\hat{i}_y$ are input into the corresponding look-up table modules, and the two look-up table modules output the corresponding actual suspension forces $\hat{F}_x$, $\hat{F}_y$ to the active magnetic hearing.

Further, in Step (1), N levels of control currents and M levels of displacement eccentricities are selected for finite element simulation to obtain N*M finite element models; the control currents, the displacement eccentricities, and the corresponding suspension forces of the N*M finite element models in the X-axis and Y-axis directions are collected; the control currents and the displacement eccentricities in the X-axis and Y-axis directions of each of the finite element models are used as an independent variable x and the corresponding suspension forces are used as a dependent variable $\hat{y}(x)$, and the independent variable x and the dependent variable $\hat{y}(x)$ are substituted into a general universal Kriging model $\hat{y}(x)=F(\beta, x)+z(x)$ to obtain two universal Kriging prediction models $\hat{F}_x(\hat{i}_x, \hat{x}_0)=F_1(\hat{\beta}, \hat{i}_x, \hat{x}_0)+z_1(\hat{i}_x, \hat{x}_0)$ and $\hat{F}_y(\hat{\beta},\hat{i}_y, \hat{x}_0)$, and $F_1(\hat{\beta},\hat{i}_y, \hat{y}_0)$ through fitting, wherein $F(\beta, x)$, $F_1(\hat{\beta}, \hat{i}_x, \hat{x}_0)$, and $F_1(\hat{\beta}, \hat{i}_y, \hat{y}_0)$ are regression models, $z(x)$, $z_1(\hat{i}_x, \hat{x}_0)$, and $z_1(\hat{i}_y, \hat{y}_0)$ are error terms, $\beta$ is a regression coefficient of the general universal Kriging model, and $\hat{\beta}$ is a regression coefficient of the universal Kriging prediction model.

Further, the fuzzy adaptive PID controller in Step (3) consists of a fuzzy inference system, a proportional term, an integral term, and a derivative term; the displacement errors $e_x$, $e_y$ and first-order derivatives $\dot{e}_x$, $\dot{e}_y$ thereof are input into the corresponding fuzzy inference systems, and each of the fuzzy inference systems Outputs a proportional modification coefficient CP, an integral modification coefficient CI, and a derivative modification coefficient CD; the proportional modification coefficient CP, the integral modification coefficient CI, and the derivative modification coefficient CD are respectively multiplied by a corresponding proportional coefficient KP, integral coefficient KI, and derivative coefficient KD to obtain a modified proportional term, integral term, and derivative term; a summation operation is performed on the outputs of the modified proportional term, integral term, and derivative term based on the displacement errors $e_x$, $e_y$ to obtain the initial control currents $I_{x0}$, $I_{y0}$.

The present invention has the following beneficial effects:

1. The present invention constructs accurately changing models of an active magnetic bearing under different displacement eccentricities and control currents based on the universal Kriging model theory and the suspension control principle of the active magnetic bearing, and obtains parameter tables for prediction of the actual suspension forces required by the active magnetic bearing along with the displacement change of the rotor. The parameter tables are created quickly, the tabulation cost is saved, more accurate models of the active magnetic bearing can be obtained according to actual situations, and the control accuracy is improved.

2. Compared with the conventional control of the active magnetic bearing, the present invention does not concern the fixed displacement stiffness and current stiffness in the process, so that its applicability is expanded from a pseudolinear region near a working point to a non-linear region where both displacements and currents are large, and thus the control accuracy and the control range are improved.

3. Since the models are changeable, a common controller cannot make adjustments according to the models, and thus the present invention constructs a fuzzy adaptive PID control module, wherein errors and error rates are used as inputs on the basis of a PID algorithm, PID regulator parameters are changed through current control conditions, and fuzzy rules are used for fuzzy inference, so that the requirements on self-tuning of the PID parameters in accordance with errors and error rates at different times are met and more accurate control of the active magnetic bearing can be achieved.

DETAILED DESCRIPTION OF THE EMBODIMENTS

Figure 1:
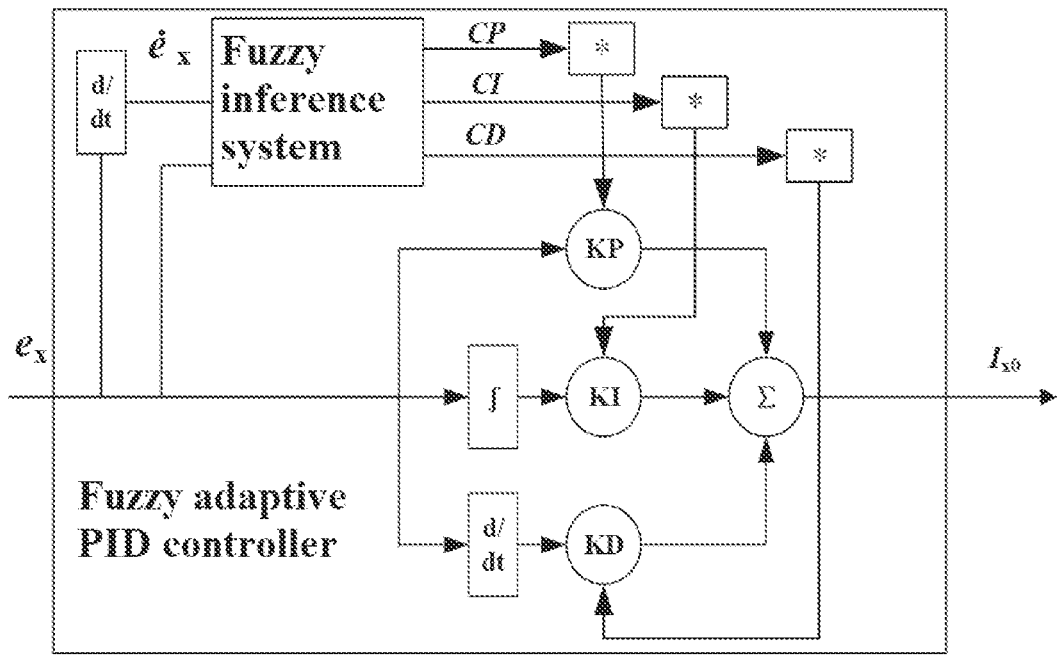
FIG. 1 is a block diagram of a fuzzy adaptive PID controller.

In the present invention, firstly, finite element models of an active magnetic bearing are built. Two universal Kriging prediction models in X-axis and Y-axis directions about actual suspension forces $\hat{F}_x$, $\hat{F}_y$ being in association with actual displacement eccentricities $\hat{x}_0$, $\hat{y}_0$ and actual control currents $\hat{i}_x$, $\hat{i}_y$ in the X-axis and Y-axis directions of the active magnetic bearing are obtained by using the finite element models of the active magnetic bearing. Two model state tables in the X-axis and Y-axis directions about the actual suspension forces $\hat{F}_x$, $\hat{F}_y$ being in association with the actual displacement eccentricities $\hat{x}_0$, $\hat{y}_0$ and the actual control currents $\hat{i}_x$, $\hat{i}_y$ are created. Based on the two model state tables, two look-up table modules with the two model state tables being built in are constructed, respectively. Two fuzzy adaptive PID controllers in the X-axis and Y-axis directions are constructed. Finally, the two fuzzy adaptive PID controllers, two corresponding amplifier modules in the X-axis and Y-axis directions, the two look-up table modules, and two corresponding measurement modules in the X-axis and Y-axis directions are used together to constitute an active magnetic bearing controller, which implements accurate control of the active magnetic bearing. The specific method is as follows:

Dimension parameters of an active magnetic bearing to be controlled are measured, finite element models of the active magnetic bearing are built in finite element software, and performance parameters of the active magnetic bearing are obtained through simulation. On the premise of unsaturated magnetic field strength, N levels of control currents and M levels of displacement eccentricities are selected for finite element simulation to obtain N*M finite element models, wherein N and M are selected according to the control currents, an air gap range, and the fineness of the models required. Then, data about the control currents in the X-axis and Y-axis directions, the displacement eccentricities in the X-axis and Y-axis directions, and the corresponding suspension forces in the X-axis and Y-axis directions of the N*M finite element models are collected. The control currents and the displacement eccentricities in the X-axis and Y-axis directions of each model are a measured independent variable, and the corresponding suspension forces in the X-axis and Y-axis directions are a dependent variable. The present invention is described below by taking the X-axis direction as an example, and the implementation in the Y-axis direction is the same as that in the X-axis direction:

Data about the control currents $\{i_{11}, i_{12}, \ldots, i_{NM}\}$, the displacement eccentricities $\{x_{11}, x_{12}, \ldots, x_{NM}\}$, and the corresponding suspension forces $\{F_{11}, F_{12}, \ldots, F_{NM}\}$ in the X-axis direction of the N*M finite element models are collected. The control currents $\{i_{11}, i_{12}, \ldots, i_{NM}\}$ and the displacement eccentricities $\{x_{11}, x_{12}, \ldots, x_{NM}\}$ of each of the finite element models are a measured independent variable, and the suspension forces $\{F_{11}, F_{12}, \ldots, F_{NM}\}$ are a dependent variable. The independent variable can be expressed as $X_{ij}=[i_{ij}, x_{ij}]^T$, and the dependent variable can be expressed as $Y_{ij}=F_{ij}$, wherein $i=1, 2, \ldots$, and $j=1, 2, \ldots$, M.

The general universal Kriging model is expressed as:

$$\hat{y}(x)=F(\beta,x)+z(x) \qquad (1)$$

wherein $\hat{y}(x)$ is a final result value, that is, a dependent variable; $F(\beta, x)$ is a regression model, wherein $\beta$ is a regression coefficient and x is an independent variable of the universal Kriging model; $z(x)$ is an error term in normal distribution with a mean of 0 and a variance of $\sigma_z^2$, wherein the variance $\sigma_z^2$ is selected according to specific applications and will influence the accuracy of an approximate model. The regression model $F(\beta, x)$ is expressed as:

$$F(\beta,x)=\beta_1 f_1(x)+ \ldots +\beta_p f_p(x)=f(x)^T \beta \qquad (2)$$

wherein $\beta_1, \beta_2, \ldots, \beta_p$ are regression coefficients of each order and $f_p(x)$ is a p-order approximate model.

The independent variable $X_{ij}$ and the dependent variable of the finite element models are used to respectively substitute x and $\hat{y}(x)$ in the formula (1) of the general universal Kriging model. A universal Kriging prediction model in the X-axis direction about the actual suspension forces $\hat{F}_x$ being in association with the actual displacement eccentricities $\hat{x}_0$ and the actual control currents $\hat{i}_x$ in the X-axis direction of the active magnetic bearing can be obtained through fitting and is specifically expressed as:

$$\hat{F}_x(\hat{i}_x,\hat{x}_0)=F_1(\hat{\beta},\hat{i}_x,\hat{x}_0)+z_1(\hat{i}_x,\hat{x}_0) \qquad (3)$$

wherein $\hat{\beta}$ is a regression coefficient of the built universal Kriging prediction model, and $z_1(\hat{i}_x, \hat{x}_0)$ is an error term about the actual control currents $\hat{i}_x$ and the actual displacement eccentricities $\hat{x}_0$ in the X-axis direction.

Similarly, the universal Kriging prediction model in the Y-axis direction is obtained as follows:

$$\hat{F}_y(\hat{i}_y,\hat{y}_0)=F_1(\hat{\beta},\hat{i}_y,\hat{y}_0)+z_1(\hat{i}_y,\hat{y}_0),$$

wherein $F_1(\hat{\beta}, \hat{i}_y, \hat{y}_0)$ is a regression model of the built universal Kriging prediction model, and $z_1(\hat{i}_y, \hat{y}_0)$ is an error term about the actual control currents $\hat{i}_y$ and the actual displacement eccentricities $\hat{y}_0$ in the Y-axis direction.

Two model state tables about the actual suspension forces $\hat{F}_x$, $\hat{F}_y$ being in association with the actual displacement eccentricities $\hat{x}_0$, $\hat{y}_0$ and the actual control currents $\hat{i}_x$, $\hat{i}_y$ are created according to the obtained two universal Kriging prediction models in the X-axis and Y-axis directions, respectively. Specifically, a model state table 1 about the actual suspension forces $\hat{F}_x$ being in association with the actual displacement eccentricities $\hat{x}_0$ and the actual control currents $\hat{i}_x$ in the X-axis direction is built, and a model state table 2 about the actual suspension forces $\hat{F}_y$ being in association with the actual displacement eccentricities $\hat{y}_0$ and the actual control currents $\hat{i}_y$ in the Y-axis direction is built:

TABLE 1

| Actual displacement eccentricities/control currents in the X-axis direction | 0 | 0.01 | 0.02 | 0.03 | ... | $x_{max}$ |
|---|---|---|---|---|---|---|
| 0 | $F_{11}$ | $F_{12}$ | $F_{13}$ | $F_{14}$ | ... | $F_{1a}$ |
| 0.1 | $F_{21}$ | $F_{22}$ | $F_{23}$ | $F_{24}$ | ... | $F_{2a}$ |
| 0.2 | $F_{31}$ | $F_{32}$ | $F_{33}$ | $F_{34}$ | ... | $F_{3a}$ |
| 0.3 | $F_{41}$ | $F_{42}$ | $F_{43}$ | $F_{44}$ | ... | $F_{4a}$ |
| ⋮ | ⋮ | ⋮ | ⋮ | ⋮ | ⋱ | ⋮ |
| $i_{max}$ | $F_{b1}$ | $F_{b2}$ | $F_{b3}$ | $F_{b4}$ | ... | $F_{ba}$ |

TABLE 2

| Actual displacement eccentricities/control currents in the Y-axis direction | 0 | 0.01 | 0.02 | 0.03 | ... | $y_{max}$ |
|---|---|---|---|---|---|---|
| 0 | $F'_{11}$ | $F'_{12}$ | $F'_{13}$ | $F'_{14}$ | ... | $F'_{1a}$ |
| 0.1 | $F'_{21}$ | $F'_{22}$ | $F'_{23}$ | $F'_{24}$ | ... | $F'_{2a}$ |
| 0.2 | $F'_{31}$ | $F'_{32}$ | $F'_{33}$ | $F'_{34}$ | ... | $F'_{3a}$ |
| 0.3 | $F'_{41}$ | $F'_{42}$ | $F'_{43}$ | $F'_{44}$ | ... | $F'_{4a}$ |
| ⋮ | ⋮ | ⋮ | ⋮ | ⋮ | ⋱ | ⋮ |
| $i_{ymax}$ | $F'_{b1}$ | $F'_{b2}$ | $F'_{b3}$ | $F'_{b4}$ | ... | $F'_{ba}$ |

Taking Table 1 as an example, the first row is about the actual displacement eccentricities $\hat{x}_0$ in the X-axis direction, and the first column is about the actual control currents $\hat{i}_x$. The actual displacement eccentricities $\hat{x}_0$ start from 0 to the maximum eccentricity $x_{max}$ and are sampled at an interval of 0.01 mm; meanwhile, the actual control currents $\hat{i}_x$ start from 0 and are sampled at an interval of 0.1 A. The sampled values of the actual displacement eccentricities $\hat{x}_0$ and the actual control currents $\hat{i}_x$ are substituted into the formula (3) to calculate the actual suspension forces $\hat{F}_x$ associated with the sampled values, and the model state table 1 is created accordingly. Therefore, each of the actual displacement eccentricities $\hat{x}_0$ and each of the actual control currents $\hat{i}_x$ are corresponding to one of the actual suspension forces $\hat{F}_x$, as shown by $F_{11}$ to $F_{ba}$ in Table 1, wherein $x_{max}$ is a maximum displacement in the X-axis direction and $i_{max}$ is a maximum control current. Taking Table 1 as an example, when the actual displacement eccentricity is 0.01 mm and the actual control current is 0.1 A, the actual suspension force is $F_{22}$; and when the actual displacement eccentricity is 0.03 mm and the actual control current is 0.2 A, the actual suspension force is $F_{34}$. In Table 1, b and a are respectively the number of the sampled actual displacement eccentricities and the number of the sampled actual control currents. Similarly, in Table 2, the actual suspension forces are $F'_{11}$ to $F'_{ba}$, $y_{max}$ is a maximum displacement in the Y-axis direction, and $i_{ymax}$ is a maximum control current in the Y-axis direction. Similarly, in Table 2, the first row is about the actual displacement eccentricities $\hat{y}_0$ in the Y-axis direction, and the first column is about the actual control currents $\hat{i}_y$. The sampling mode is the same as that in the X-axis direction. The sampled values of the actual displacement eccentricities $\hat{y}_0$ and the actual control currents $\hat{i}_y$ are substituted into the formula (3) to calculate the actual suspension forces $\hat{F}_y$ associated with the sampled values, and the model state table 2 is created accordingly.

As for data of the actual displacement eccentricities and the actual control currents that are not sampled values, the corresponding actual suspension forces are calculated through interpolation. Taking the X-axis direction as an example, when the actual displacement eccentricity is $x_0$ and the actual control current is $i_0$, the positions of $x_0$ and $i_0$ in Table 1 need to be determined first. Assume that the displacement eccentricity of $\{x_0, i_0\}$ falls between the sampled values $x_1$ and $x_2$, the control current falls between the sampled values $i_1$ and $i_2$, $x_1$ and $x_2$ satisfy $x_1+0.01$ mm$=x_2$, $i_1$ and $i_2$ satisfy $i_1+0.1$ A$=i_2$, and $x_1$, $x_2$, $i_1$, and $i_2$ are all sampled displacements and currents. At this time, the actual suspension force corresponding to the sampled values $\{x_1, i_1\}$ is $F_{c,d}$, the actual suspension force corresponding to $\{x_1, i_2\}$ is $F_{c,d+1}$, the actual suspension force corresponding to $\{x_2, i_1\}$ is $F_{c+1,d}$, and the actual suspension force corresponding to $\{x_2, i_2\}$ is $F_{c+1,d+1}$, wherein c and d are the row number and the column number of the sampled values $\{x_1, i_1\}$ in Table 1. Then, the actual suspension force corresponding to $\{k_0, i_0\}$ can be calculated as:

$$F_{x_0/i_0} = \left(\frac{(x_2-x_0)}{0.01}*F_{c,d+1} + \frac{-(x_1-x_0)}{0.01}*F_{c,d}\right)*\frac{i_0-i_1}{0.1} +$$
$$\left(\frac{(x_2-x_0)}{0.01}*F_{c+1,d+1} + \frac{-(x_1-x_0)}{0.01}*F_{c+1,d}\right)*\frac{i_2-i_0}{0.1}.$$

For example, when the actual displacement eccentricity is 0.025 mm and the actual control current is 0.25 A, the corresponding suspension force can be calculated according to data in Table 1 as follows:

$$F_{0.025/0.25} = \left(\frac{(0.03-0.025)}{0.01}*F_{24} + \frac{-(0.02-0.025)}{0.01}*F_{23}\right)*\frac{0.25-0.2}{0.1} +$$
$$\left(\frac{(0.03-0.025)}{0.01}*F_{34} + \frac{-(0.02-0.025)}{0.01}*F_{33}\right)*\frac{0.3-0.25}{0.1}.$$

Similarly, as for data of the actual displacement eccentricities and the actual control currents in the Y-axis direction that are not sampled values, the corresponding actual suspension forces are calculated through interpolation in the same way.

Two look-up table modules are constructed, wherein the model state table 1 and the model state Table 2 are respectively built in the look-up table module in the X-axis direction and the look-up table module in the Y-axis direction.

Figure 2:
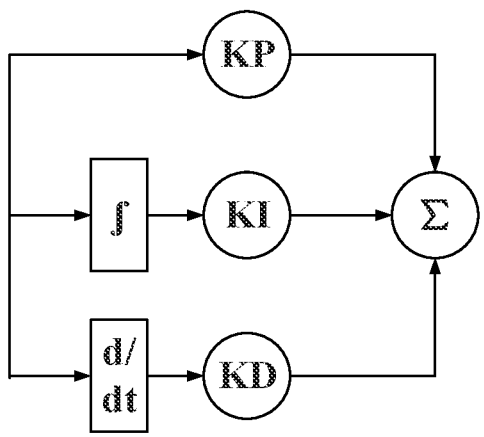
FIG. 2 is a block diagram of a common PID controller.

A fuzzy adaptive PID controller shown in FIG. 1 is constructed. Since changes of input currents and displacements of the active magnetic bearing may cause certain errors in the models, a common controller cannot make adjustments according to the models, and thus the present invention adopts a fuzzy adaptive PID controller for control. FIG. 2 is a structural block diagram of an existing common PID controller, which mainly consists of a proportional term, an integral term, and a derivative term. The proportional term is directly composed of a proportional coefficient KP, the integral term is directly composed of an integral coefficient KI and an integral module $\int$, and the derivative term is directly composed of a derivative coefficient KD and a derivative module d/dt. A summation operation, denoted by $\Sigma$, is performed on the three terms to obtain a final output. FIG. 1 shows the fuzzy adaptive PID controller in the X-axis direction that is constructed by the present invention and consists of a fuzzy inference system, a proportional term, an integral term, and a derivative term. Compared with the existing common PID controller shown in FIG. 2, improvements have been made in the controller in FIG. 1, and the fuzzy inference system is employed in addition to the proportional term, the integral term, and the derivative term in the PID controller in FIG. 2. Taking the fuzzy adaptive PID controller in the X-axis direction as an example, displacement errors $e_x$ in the X-axis direction and first-order derivatives $\dot{e}_x$ thereof are input into the fuzzy inference system, and the fuzzy inference system calculates according to the displacement errors $e_x$ and the first-order derivatives $\dot{e}_x$ to output a proportional modification coefficient CP, an integral modification coefficient CI, and a derivative modification coefficient CD. The proportional modification coefficient CP, the integral modification coefficient CI, and the derivative modification coefficient CD are respectively multiplied by the corresponding proportional coefficient KP, integral coefficient KI, and derivative coefficient KD to obtain the modified proportional coefficient, the modified integral coefficient, and the modified derivative coefficient, which are expressed as:

$$\begin{cases} K_P^* = CP*KP \\ K_I^* = CI*KI \\ K_D^* = CD*KD \end{cases} \quad (5)$$

A summation operation, denoted by $\Sigma$, is performed on the modified proportional term, integral term, and derivative term to obtain a final output. That is, initial control currents $I_{x0}$ output in the X-axis direction can be accurately controlled through the modified proportional term, integral term, and derivative term based on the displacement errors $e_x$.

According to the influence of parameter adjustment on the output performance of the system, the modification coefficients CP, CI, CD are adjusted based on the following principles: When $e_x$ is large, $K^*_P$ is increased, $K^*_D$ is decreased, and $K^*_I$ is kept moderate through the modification coefficients to improve the response speed of the system and meanwhile prevent excessive overshoot. When $e_x$ is moderate, $K^*_P$ and $K^*_I$ are kept small while $K^*_D$ is kept moderate through the modification coefficients to reduce the overshoot and meanwhile enable the system to respond quickly. When $e_x$ is small, $K^*_P$ and $K^*_I$ are increased while $K^*_D$ is kept moderate through the modification coefficients to ensure good stability of the system, avoid system oscillation, and enhance the anti-interference performance of the system.

Similarly, the fuzzy adaptive PID controller in the Y-axis direction is constructed in the same way as the fuzzy adaptive PID controller in the X-axis direction. Displacement errors $e_y$ in the Y-axis direction and first-order derivatives $\dot{e}_y$ thereof are input into the corresponding fuzzy inference system in the Y-axis direction, and the fuzzy inference system outputs a proportional modification coefficient CP, an integral modification coefficient CI, and a derivative modification coefficient CD. The proportional modification coefficient CP, the integral modification coefficient CI, and the derivative modification coefficient CD are respectively multiplied by the corresponding proportional coefficient KP, integral coefficient KI, and derivative coefficient KD to obtain the modified proportional term, integral term, and derivative term. A summation operation is performed on the outputs of the modified proportional term, integral term, and derivative term based on the displacement errors $e_y$ to obtain initial control currents $I_{y0}$ in the Y-axis direction.

Figure 3:
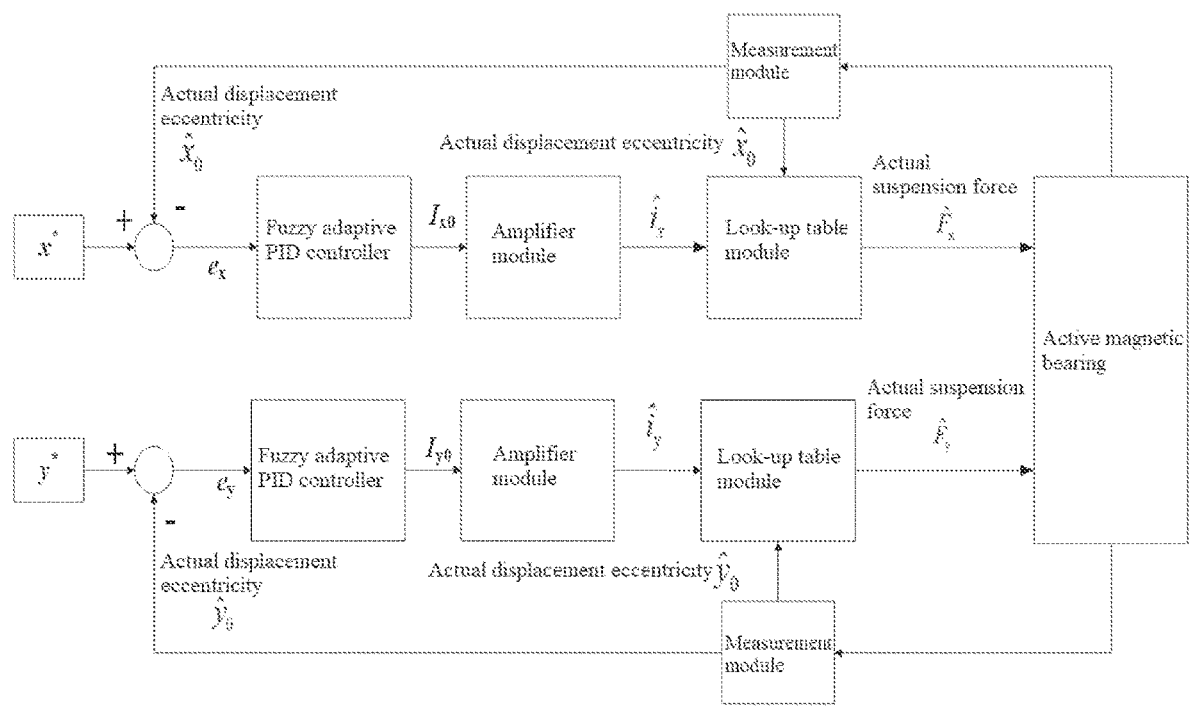
FIG. 3 is a structural block diagram of an active magnetic bearing controller constructed by using a method of the present invention.

An active magnetic bearing controller shown in FIG. 3 is constructed. The active magnetic bearing controller consists of two fuzzy adaptive PID controllers, two amplifier modules, two look-up table modules, and two measurement modules in the X-axis and Y-axis directions, and is connected to an input end of the active magnetic bearing to implement control of the active magnetic bearing. The fuzzy adaptive PID controller, the amplifier module, and the look-up table module in the X-axis direction are connected in series and then connected to the input end of the active magnetic bearing. The fuzzy adaptive PID controller, the amplifier module, and the look-up table module in the Y-axis direction are connected in series and then connected to the input end of the active magnetic bearing. The two measurement modules in the X-axis and Y-axis directions measure, through displacement sensors, the actual displacement eccentricities $\hat{x}_0$, $\hat{y}_0$ in the X-axis and Y-axis directions of the active magnetic bearing, respectively. The actual displacement eccentricities $\hat{x}_0$ in the X-axis direction are input into the look-up table module in the X-axis direction, and the actual displacement eccentricities $\hat{y}_0$ in the Y-axis direction are input into the look-up table module in the Y-axis direction. The reference displacements x* are subtracted from the actual displacement eccentricities $\hat{x}_0$ to obtain the displacement errors $e_x$ in the X-axis direction. The initial control currents $I_{x0}$ are obtained through the fuzzy adaptive PID controller in the X-axis direction by using the displacement errors $e_x$, and the actual control currents $\hat{i}_x$ are obtained through the amplifier module in the X-axis direction. The actual control currents $\hat{i}_x$ are input into the look-up table module in the X-axis direction, and the look-up table module in the X-axis direction obtains the actual suspension forces $\hat{F}_x$ according to data in the model state table 1. Similarly, the reference displacements y* are subtracted from the actual displacement eccentricities $\hat{y}_0$ to obtain the displacement errors $e_y$ in the Y-axis direction. The initial control currents $I_{y0}$ are obtained through the fuzzy adaptive HD controller in the Y-axis direction by using the displacement errors $e_y$, and the actual control currents $\hat{i}_y$ are obtained through the amplifier module in the Y-axis direction. The actual control currents $\hat{i}_y$ are input into the look-up table module in the Y-axis direction, and the look-up table module in the Y-axis direction obtains the actual suspension forces $\hat{F}_y$ according to data in the model state table 2 and outputs the actual suspension forces $\hat{F}_y$ to the active magnetic bearing. That is, the look-up table modules in the X-axis and Y-axis directions respectively output the corresponding actual suspension forces $\hat{F}_x$, $\hat{F}_y$ to the active magnetic bearing, to implement control of the active magnetic bearing in the X-axis and Y-axis directions.

What is claimed is:

1. A method for constructing an active magnetic bearing controller based on a look-up table method, comprising the following steps:

step (1): building finite element models of an active magnetic bearing, and obtaining, by using the finite element models and based on a general universal Kriging model, two universal Kriging prediction models about actual suspension forces $\hat{F}_x$, $\hat{F}_y$ being in association with actual displacement eccentricities $\hat{x}_0$, $\hat{y}_0$ and actual control currents $\hat{i}_x$, $\hat{i}_y$ in X-axis and Y-axis directions;

step (2): creating, based on the two universal Kriging prediction models, two model state tables about the actual suspension forces $\hat{F}_x$, $\hat{F}_y$ being in association with the actual displacement eccentricities $\hat{x}_0$, $\hat{y}_0$ and the actual control currents $\hat{i}_x$, $\hat{i}_y$ to construct two look-up table modules with the two model state tables being built in, respectively; and step (3): constructing the active magnetic bearing controller by using two fuzzy adaptive proportional-integral-derivative (PID) controllers, two amplifier modules, two look-up table modules, and two measurement modules in the X-axis and Y-axis directions, wherein at least one fuzzy adaptive PID controller, at least one amplifier module, and at least one look-up table module in the X-axis direction are connected in series and then connected to an input end of the active magnetic bearing; at least one fuzzy adaptive PID controller, at least one amplifier module, and at least one look-up table module in the Y-axis direction are connected in series and then connected to the input end of the active magnetic bearing; the two measurement modules in the X-axis and Y-axis directions measure the actual displacement eccentricities $\hat{x}_0$, $\hat{y}_0$ of the active magnetic bearing in the X-axis and Y-axis directions, respectively; the actual displacement eccentricities $\hat{x}_0$, $\hat{y}_0$ are input into the two look-up table modules, respectively; reference displacements x*, y* in the X-axis and Y-axis directions are subtracted from the corresponding actual displacement eccentricities $\hat{x}_0$, $\hat{y}_x$ to obtain displacement errors $e_x$, $e_y$, respectively; initial control currents $I_{x0}$, $I_{y0}$ are obtained through the fuzzy adaptive PID controllers by using the displacement errors $e_x$, $e_y$, and actual control currents $\hat{i}_x$, $\hat{i}_y$ are obtained through the amplifier modules by using the initial control currents $I_{x0}$, $I_{y0}$, respectively; the actual control currents $\hat{i}_x$, $\hat{i}_y$ are input into the look-up table modules, and the two look-up table modules output the corresponding actual suspension forces $\hat{F}_x$, $\hat{F}_y$ to the active magnetic bearing.

2. The method for constructing the active magnetic bearing controller based on the look-up table method according to claim 1, wherein in step (1), N levels of control currents and M levels of displacement eccentricities are selected for finite element simulation to obtain N*M finite element models; control currents in the X-axis and Y-axis directions, the displacement eccentricities, and the corresponding suspension forces of the N*M finite element models in the X-axis and Y-axis directions are collected; the control currents and the displacement eccentricities in the X-axis and Y-axis directions of each of the finite element models are used as an independent variable x and the corresponding suspension forces are used as a dependent variable $\hat{y}(x)$, and the independent variable x and the dependent variable $\hat{y}(x)$ are substituted into a general universal Kriging model $\hat{y}(x)=F(\beta,x)+z(x)$ to obtain the two universal Kriging prediction models $\hat{F}_x(\hat{i}_x,\hat{x}_0)=F_1(\hat{\beta},\hat{i}_x,\hat{x}_0)+z_1(\hat{i}_x,\hat{x}_0)$ and $\hat{F}_y(\hat{i}_y,\hat{y}_0)=F_1(\hat{\beta},\hat{i}_y,\hat{y}_0)+z_1(\hat{i}_y,\hat{y}_0)$ through fitting, wherein F($\beta$, x), $F_1(\hat{\beta},\hat{i}_x,\hat{x}_0)$, and $F_1(\hat{\beta},\hat{i}_y,\hat{y}_0)$ are regression models, z(x), $z_1(\hat{i}_x, \hat{x}_0)$, and $z_1(\hat{i}_y,\hat{y}_0)$ are error terms, $\beta$ is a regression coefficient of the general universal Kriging model, and $\hat{\beta}$ is a regression coefficient of each of the two universal Kriging prediction models.

3. The method for constructing the active magnetic bearing controller based on the look-up table method according to claim 2, wherein the actual displacement eccentricities $\hat{x}_0$, $\hat{y}_0$ start from 0 and are sampled at an interval of 0.01 mm, the actual control currents $\hat{i}_x$, $\hat{i}_y$ start from 0 and are sampled at an interval of 0.1 A, sampled values of the actual displacement eccentricities $\hat{x}_0$, $\hat{y}_0$ and the actual control currents $\hat{i}_x$, $\hat{i}_y$ are substituted into the two universal Kriging prediction models to calculate the actual suspension forces $\hat{F}_x$, $\hat{F}_y$, to create the two model state tables.

4. The method for constructing the active magnetic bearing controller based on the look-up table method according to claim 3, wherein first rows of the two model state tables are about the actual displacement eccentricities $\hat{x}_0$, $\hat{y}_0$ and first columns of the two model state tables are about the actual control currents $\hat{i}_x$, $\hat{i}_y$, respectively; and each of the actual displacement eccentricities $\hat{x}_0$, $\hat{y}_0$ and each of the actual control currents $\hat{i}_x$, $\hat{i}_y$ are corresponding to one of the actual suspension forces $\hat{F}_x$, $\hat{F}_y$.

5. The method for constructing the active magnetic bearing controller based on the look-up table method according to claim 3, wherein as for data of the actual displacement eccentricities and the actual control currents that are not the sampled values, the corresponding actual suspension forces are calculated through interpolation.

6. The method for constructing the active magnetic bearing controller based on the look-up table method according to claim 1, wherein each of the two fuzzy adaptive PID controllers in step (3) consists of a fuzzy inference system, a proportional term, an integral term, and a derivative term; the displacement errors $e_x$, $e_y$ and first-order derivatives $\dot{e}_x$, $\dot{e}_y$ thereof are input into the fuzzy inference systems, and the fuzzy inference systems outputs a proportional modification coefficient CP, an integral modification coefficient CI, and a derivative modification coefficient CD; the proportional modification coefficient CP, the integral modification coefficient CI, and the derivative modification coefficient CD are respectively multiplied by a corresponding proportional coefficient KP, integral coefficient KI, and derivative coefficient KD to obtain a modified proportional term, integral term, and derivative term; a summation operation is performed on outputs of the modified proportional term, integral term, and derivative term based on the displacement errors $e_x$, $e_y$ to obtain the initial control currents $I_{x0}$, $I_{y0}$.

\* \* \* \* \*